United States Patent [19]
Arnott

[11] Patent Number: 5,260,012
[45] Date of Patent: * Nov. 9, 1993

[54] MOLDING PLASTIC ARTICLES

[75] Inventor: Robin Arnott, Alliston, Canada

[73] Assignee: Husky Injection Molding Systems Ltd., Bolton, Canada

[*] Notice: The portion of the term of this patent subsequent to Dec. 3, 2008 has been disclaimed.

[21] Appl. No.: 918,694

[22] Filed: Jul. 27, 1992

Related U.S. Application Data

[60] Division of Ser. No. 734,148, Jul. 22, 1991, Pat. No. 5,192,555, which is a continuation-in-part of Ser. No. 480,866, Feb. 16, 1990, Pat. No. 5,069,840.

[51] Int. Cl.⁵ .................... B29C 45/02; B29C 45/13
[52] U.S. Cl. .................... 264/69; 264/297.2; 264/328.8; 264/328.12; 264/328.14; 264/328.19; 425/560; 425/562; 425/572; 425/573
[58] Field of Search ............. 425/544, 557, 560, 562, 425/572, 573; 264/69, 71, 297.2, 328.8, 328.12, 328.14, 328.15, 328.18, 328.19

[56] References Cited

U.S. PATENT DOCUMENTS

| | | | |
|---|---|---|---|
| 3,709,644 | 1/1973 | Farrell | 425/560 |
| 3,861,841 | 1/1975 | Hanning . | |
| 4,242,073 | 12/1980 | Tsuchiya et al. | 425/572 |
| 4,699,581 | 10/1987 | Nagasaka et al. | 425/574 |
| 4,717,324 | 1/1988 | Schad et al. | 425/573 |
| 4,722,679 | 2/1988 | Farrell | 425/560 |
| 4,775,308 | 10/1988 | Schad et al. | 425/572 |
| 4,808,101 | 2/1989 | Schad et al. | 425/130 |
| 4,863,369 | 9/1989 | Schad et al. | 425/572 |
| 4,863,665 | 9/1989 | Schad et al. | 264/328.8 |
| 4,925,161 | 5/1990 | Allan et al. | 264/328.8 |
| 4,931,234 | 6/1990 | Schad et al. | 425/588 |
| 4,994,220 | 2/1991 | Gutjahr et al. | 264/328.8 |
| 5,069,840 | 12/1991 | Arnott | 425/572 |

FOREIGN PATENT DOCUMENTS

| | | |
|---|---|---|
| 339184 | 11/1989 | European Pat. Off. . |
| 1463687 | 2/1977 | United Kingdom . |
| 2170142 | 7/1986 | United Kingdom . |

OTHER PUBLICATIONS

Article entitled "Multiple Live-Feed Injection Moulding", by P. S. Allen et al., Plastics and Rubber Processing Applications, vol. 7, No. 1, pp. 3–10, 1987.

Primary Examiner—Jill L. Heitbrink
Attorney, Agent, or Firm—Bachman & LaPointe

[57] ABSTRACT

Apparatus and method for molding plastic articles including oscillating the molten plastic in the mold cavity. The method and apparatus is particularly suitable for use with a plurality of mold cavities supplied from a single feeding means or extruder. The disclosure teaches alternately feeding molten plastic to the mold cavity from at least one shooting pot while the flow of molten plastic to the mold cavity from the feeding means is discontinued.

5 Claims, 3 Drawing Sheets

MOLDING PLASTIC ARTICLES

CROSS-REFERENCE TO RELATED APPLICATION

This is a division of application Ser. No. 734,148 filed Jul. 22, 1991 now U.S. Pat. No. 5,192,555 which is a Continuation-In-Part of copending application Ser. No. 480,866, filed Feb. 16, 1990 now, U.S. Pat. No. 5,069,840.

BACKGROUND OF THE INVENTION

The present invention relates to injection molding fiber reinforced and non-reinforced resins especially in multi-cavity molds.

It is frequently desirable to oscillate the molten resin inside the cavity of a mold. Oscillation is particularly desirable in fiber reinforced resins in order to obtain uniform properties in the molded article. However, oscillation of the resin in the mold cavity is also desirable in non-reinforced resins in order to obtain the desired product uniformity.

The process of oscillating molten resin inside the cavity of a mold in order to orient the fibers or molecules within its structure is described in U.K. Patent 2170142 and in the article "Multiple Live-Feed Injection Moulding, Plastics and Rubber Processes and Applications", 7(1987) 3–10, By P.S. Allen and M.J. Bevis. The procedure described therein utilizes a manifold containing two pistons which is attached to the nozzle of the injection plasticizing unit. This splits the resin flow path into two channels which continue through a mold hot runner manifold to injection gates or orifices on opposite ends of the mold cavity for forming a molded article. If the resin is injected into the mold, the pistons operate in an alternate manner to effectively oscillate the resin inside the mold cavity in order to orient the fibers or molecules. European Published Patent Application 0,339,184 to Gutjahr shows a similar process; however, the oscillation of the resin in the mold cavity is performed by the injection-plasticizing units themselves. In this case, two such units are required and the resin is supplied to the mold directly through cold sprues and runners. It is a disadvantage of the Gutjahr procedure that premature freezing of the melt is more likely since cold runners are being used. Also, the Gutjahr process requires two injection-plasticizing units which involves additional cost.

A disadvantage of both of the foregoing procedures is the fact that they involve a single mold cavity. It is clearly desirable to utilize injection molding with oscillation in the mold cavity and with a plurality of mold cavities especially fed from a single feeding means or injection-plasticizing unit. The procedures of both of the foregoing references are not readily adaptable to use in a multi-cavity mold which is a significant disadvantage.

U.S. Pat. Nos. 4,717,324 and 4,863,369, both to Schad and Brown, show a hot runner system for a mold including shooting pots individual to each mold cavity for feeding precisely measured quantities of thermal plastic materials to each cavity.

Accordingly, it is a principal object of the present invention to provide a method and apparatus for molding plastic articles wherein the plastic is oscillated in the mold cavity.

It is a further object of the present invention to provide a method and apparatus as aforesaid suitable for use with a plurality of mold cavities supplied from a single feeding means.

It is a further object of the present invention to provide a method and apparatus as aforesaid using a hot runner system.

Further objects and advantages of the present invention will appear hereinbelow.

SUMMARY OF THE INVENTION

In accordance with the present invention, it has now been found that the aforesaid objects and advantages may be readily obtained. The apparatus of the present invention comprises: at least one mold cavity; at least two nozzles communicating with said mold cavity for feeding molten plastic to said mold cavity; a hot runner system communicating with said nozzles for feeding molten plastic to said nozzles; feeding means for feeding molten plastic to said hot runner system; valve means in said hot runner system operative to permit the flow of molten plastic to said nozzles from said feeding means and to shut-off the flow of molten plastic to said nozzles from said feeding means; at least one shooting pot communicating with each nozzle and with the hot runner system downstream of said valve means; and means for alternately feeding molten plastic from said at least one shooting pot to each nozzle, whereby the molten plastic is oscillated in the mold cavity. A separate shooting pot may be provided communicating with each respective nozzle, or a single shooting pot may be provided communicating with two of said nozzles and feeding molten plastic alternatingly to both nozzles. Preferably at least two and generally a plurality of mold cavities are provided with at least two nozzles communicating with each cavity and shooting pots communicating with each nozzle, wherein a single feeding means is provided for feeding molten plastic to the hot runner system. Generally, the nozzles communicating with each mold cavity are located at opposite ends of each mold cavity.

The method of the present invention comprises: feeding molten plastic from a feeding means to at least one mold cavity via a hot runner system and nozzles, wherein at least two nozzles communicate with each mold cavity; providing at least one shooting pot containing molten plastic communicating with each nozzle and with the mold cavity; discontinuing the flow of molten plastic from the feeding means to the mold cavities; and alternately feeding molten plastic from the shooting pots to the mold cavities while the flow of molten plastic from the feeding means to the mold cavities is discontinued, whereby the molten plastic is oscillated in the mold cavity. In a preferred embodiment, a single shooting pot is provided communicating with two nozzles, and alternately feeding molten plastic from said one shooting pot to the mold cavities by first feeding from the shooting pot to one of said nozzles followed by feeding from the shooting pot to a second of said nozzles, said feeding being while the flow of molten plastic to the mold cavity from the feeding means and hot runner system is discontinued. In a preferred embodiment, the molten plastic is alternately fed from a first shooting pot located at one end of the mold cavity followed by feeding molten plastic from a second shooting pot located at an opposed end of the mold cavity. The molten plastic may be fed to the shooting pots via the feeding means and hot runner system simultaneously with feeding molten plastic from the feeding means and hot runner system to the mold cavity.

In accordance with the aforesaid method and apparatus, the resin is effectively and conveniently oscillated in the mold cavity. The oscillation can be readily individually controlled for each cavity and the method and apparatus of the present invention is readily utilizable with a plurality of mold cavities fed from a single feeding means.

Further features and advantages of the method and apparatus of the present invention will appear hereinbelow.

DETAILED DESCRIPTION

Figure 1:
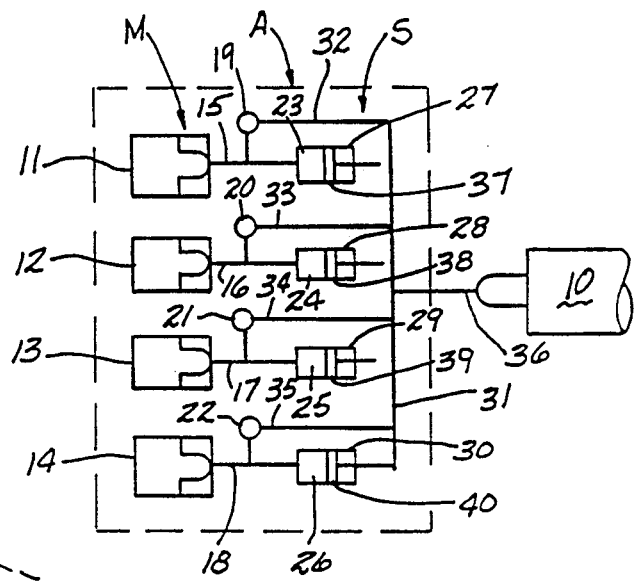
FIG. 1 shows schematically a hot runner system and a multi-cavity mold including a shooting pot individual to each mold cavity.

In FIG. 1, an assembly A within the dashed lines includes a multi-cavity mold M in combination with a hot runner system S together with an external primary plastic compound feed unit 10 defining an extruder. Mold cavities 11, 12, 13 and 14 are connected individually to the hot runner system by nozzles (not shown in FIG. 1) and compound conduits 15, 16, 17 and 18, respectively. Naturally, any desired number of cavities may be employed and the molten plastic may or may not contain fibers to obtain a fiber reinforced molded article.

Valves 19, 20, 21 and 22 are provided controlling the introduction of molten plastic from extruder 10 and hot runner system S into cavities 11, 12, 13 and 14 and also into reservoirs 23, 24, 25 and 26 of shooting pots 27, 28, 29 and 30. Thus, as shown in FIG. 1, the extruder 10 feeds both the mold cavities and the shooting pots. For simplicity and clarity of description only, a single shooting pot and a single nozzle for each mold cavity is shown in FIGS. 1 and 2.

Each valve is connected to hot runner system manifold 31 by compound conduits 32, 33, 34 and 35 and the manifold is in turn supplied molten plastic from extruder 10 via conduit 36.

The shooting pots shown in FIG. 1 define piston-cylinder assemblies where the stroke of each piston 37, 38, 39 and 40 is adjustable individually to change the volume of reservoirs 23, 24, 25 and 26 (cylinder portion) to facilitate feeding or metering precise quantities of plastic to the mold cavities on a cavity by cavity basis. When valves 19, 20, 21 and 22 are closed, no further molten plastic can be fed from extruder 10 to the mold cavities and further feeding to the mold cavities is from the shooting pots.

Figure 2:
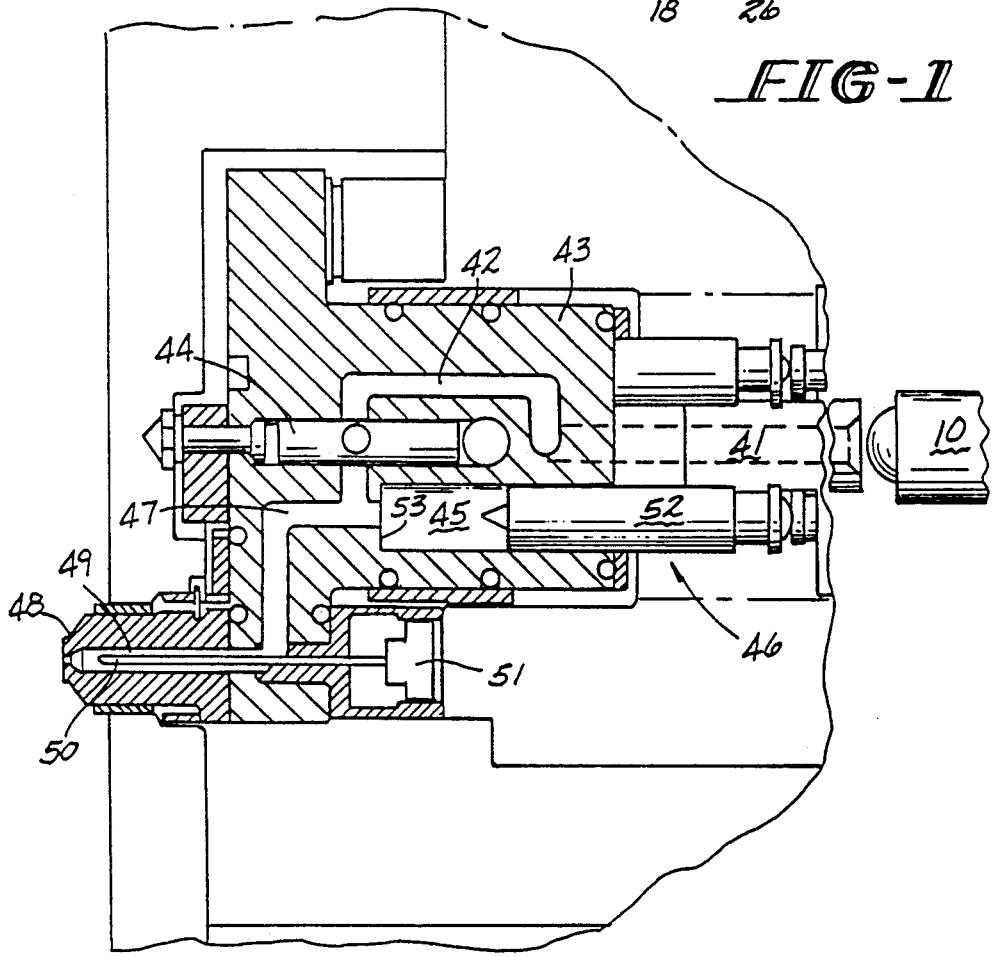
FIG. 2 is a detailed sectional view showing a shooting pot within a hot runner system.

FIG. 2 shows the details of a representative shooting pot within a hot runner system. Naturally, each shooting pot of the plurality will generally have the same construction. Extruder 10 feeds molten plastic through channels 41 and 42 of hot runner manifold block 43 and through valve means 44 to charge reservoir 45 of shooting pot 46. At the same time, molten plastic is fed via conduit 47 to the mold cavity (not shown in FIG. 2) via nozzle 48 through nozzle passage 49. Nozzle stem 50, shown in the retracted position in FIG. 2, is operated by piston 51 to open or close the nozzle passage.

When the desired amount of molten plastic is charged to the mold cavity and at the same time the shooting pot is filled, valve 44 is closed as shown in FIG. 2 and further plastic in the precise quantity desired is charged to the mold cavity via the shooting pot until shooting pot piston 52 advances until it bottoms at bottom 53 of shooting pot cylinder 45. Valve stem 50 is then closed, the product removed and the cycle repeated.

Figure 3:
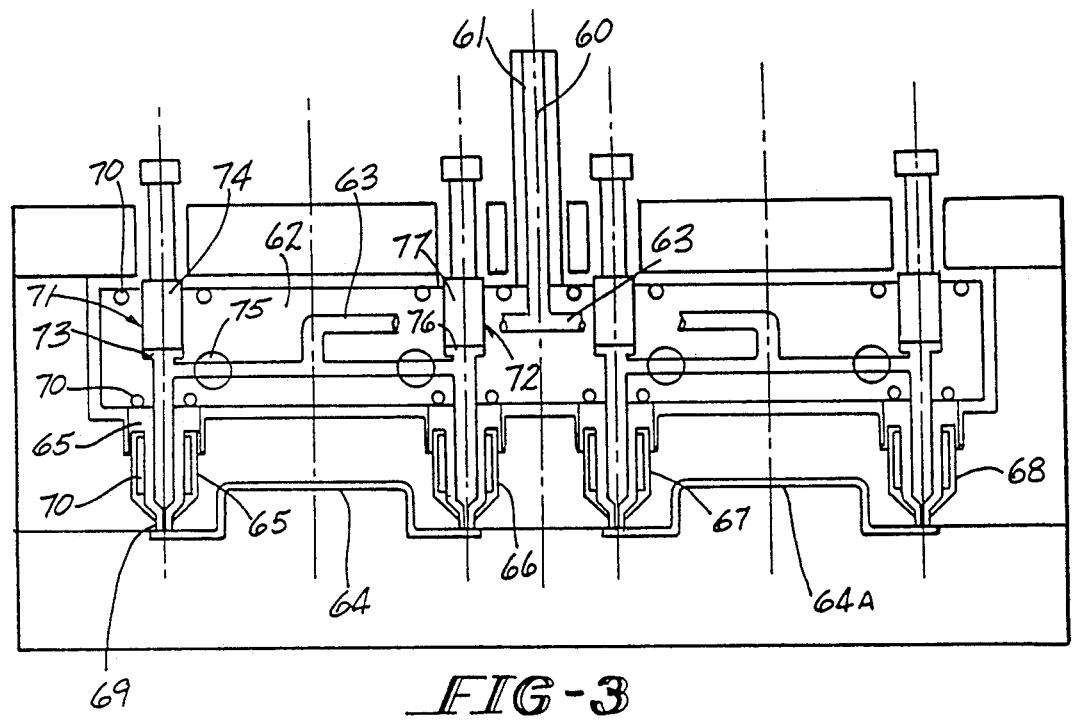
FIG. 3 is a schematic view of a two cavity mold where the feeding means is feeding both the molds and the shooting pots.
Figure 4:
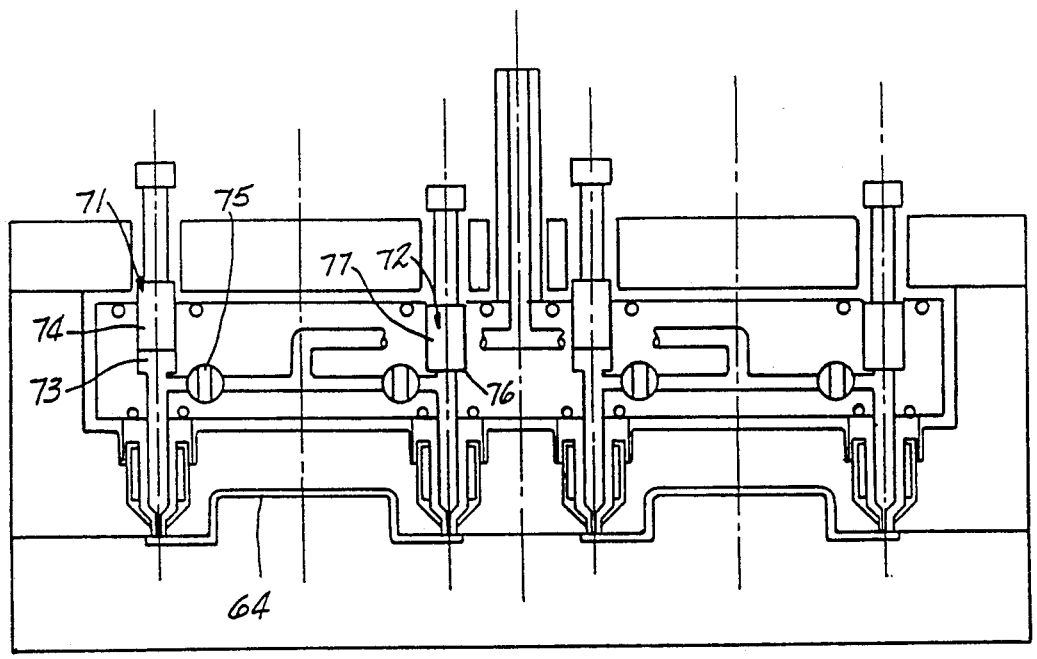
FIG. 4 is a schematic view similar to FIG. 3 where the shooting pots are shown alternately feeding the mold cavities.

FIGS. 3 and 4 show the detailed operation of the apparatus and method of the present invention. Referring to FIG. 3, molten resin with or without fibers is injected from an injection-plasticizing unit (not shown in FIG. 3) into the supply channel 60 of sprue bar 61 which in turn is connected to hot runner manifold 62. The supply channel 60 splits into as many sub-channels 63 as there are mold cavities. In the illustrated embodiment of FIG. 3, there are shown two mold cavities 64 and 64A; however, it should be understood that any desired number of mold cavities of a multi-cavity system can readily be employed. It is a significant advantage of the present invention that multi-cavity systems can readily be used with the present invention.

Thus, sub-channels 63 are bifurcated to supply molten resin to two or more cavities 64 and 64A via nozzles 65, 66, 67 and 68. As shown in FIG. 3, each mold cavity has associated therewith two nozzles feeding resin from opposite ends of the mold cavity. Thus, mold cavity 64 is fed from nozzles 65 and 66 and mold cavity 64A is fed from nozzles 67 and 68. Naturally, more than two nozzles per mold cavity can be used if desired, especially for complex parts. Each nozzle is provided with means for discontinuing resin flow into the mold, as by gates 69. The nozzles and the manifold are heated by heaters 70.

Associated with and communicating with each nozzle is a shooting pot having a construction as shown in FIGS. 1 and 2. Thus, communicating with mold 64 is first shooting pot 71 and second shooting pot 72 located in manifold 62 at opposite ends of mold 64. The shooting pot 71 includes cavity 73 and piston assembly 74 similar to that shown in FIG. 2, and shooting pot 72 includes cavity 76 and piston assembly 77.

As the melt is injected into the mold cavity 64 via sprue bar 61, sub-channels 63 and nozzle 65, some of the melt flows into shooting pot cavity 73 which has been set to receive a desired charge of resin. After cavity 64 has been filled with a desired amount of resin shut-off valves 75 are operated to close the channels and form a closed communication channel between the shooting pot and mold cavity. Shut-off valves 75 close the entrance from the hot runner system to the communication channels between the shooting pots and 4 shows valves 75 closed. The shooting pot pistons 74 and 77 are then operated alternately as shown in FIG. 4 to cause the resin in mold cavity 64 to be oscillated.

FIG. 4 shows piston 77 of second shooting pot 72 advanced and piston 74 of first shooting pot 71 retracted. This action is individual to each mold cavity since each mold cavity has two nozzles and two shooting pots associated therewith and these are isolated from neighboring cavities by shut-off valves 75. Naturally, the same action takes place at mold cavity 64A and the other mold cavities in the multi-cavity system.

After oscillation is complete, the resin in the mold cures and the mold is opened to eject the part. Meanwhile, the heaters 70 in the manifold and nozzles keep the resins molten and ready for the next cycle.

Thus, in accordance with the method and apparatus of the present invention, the flow of molten plastic from the feeding means and hot runner system is discontinued to the mold cavities followed by alternately feeding molten plastic from the shooting pots to the mold cavities while the flow of molten plastic from the feeding means and hot runner system to the mold cavities is discontinued. This results in oscillation of the molten plastic in the mold cavities.

The alternate application of the shooting pots as described hereinabove results in effective oscillation of the plastic in the mold cavity even if the mold cavity is full of resin by action of piston assemblies 74 and 77. Thus, the application of said piston assemblies will operate to put alternate pressure on the resin in the mold cavities by the alternating to and fro motion of the said piston assemblies. This effectively and conveniently obtains the desired oscillating resin movement in the mold cavities.

Figure 5:
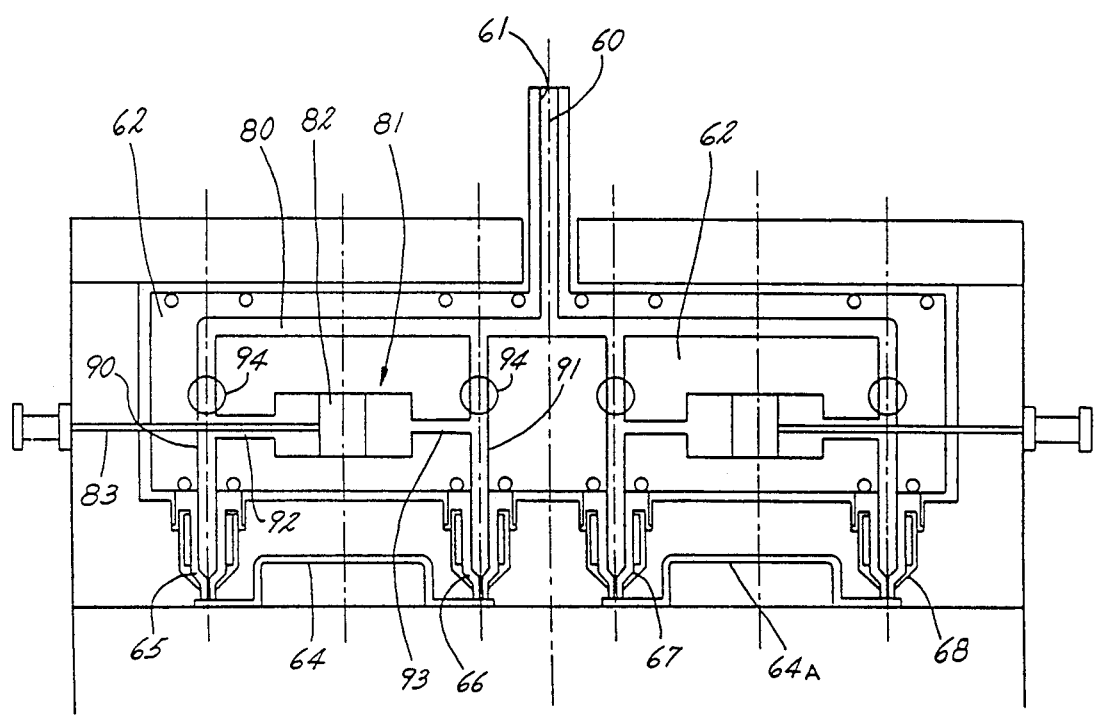
FIG. 5 is a schematic view similar to FIG. 3 showing an alternate and preferred embodiment using a single shooting pot.

FIG. 5 shows an alternate and preferred embodiment with two nozzles for each mold cavity and a single shooting pot communicating with both nozzles. The embodiment of FIG. 5 shows two mold cavities 64 and 64A with supply channel 60 of sprue bar 61 which in turn is connected to hot runner manifold 62 as in FIGS. 3-4. Similarly, each mold cavity 64 and 64A is supplied via two nozzles, nozzles 65 and 66 for cavity 64 and nozzles 67 and 68 for cavity 64A. Hot runner system 80 distributes the resin from supply channel 60 directly to the nozzles. Each mold cavity is provided with a single shooting pot 81 which includes a piston 82 connected via piston rod 83 to an actuator 84 kept external to the hot runner manifold for safety reasons. The shooting pot or piston cylinder 81 is connected to nozzle runners 90 and 91 by channels 92 and 93, respectively to form communication channels between the shooting pot and nozzles. Thus, the communication channel between the shooting pot 81 and nozzle 65 is nozzle runner 90 and channel 92, and the communication channel between the shooting pot 81 and nozzle 66 is nozzle runner 91 and channel 93. Valve means 94 are provided in hot runner 62 operative to close the entrance from the hot runner system 80 to the communication channels and form closed communication channels between the shooting pot and each nozzle. In FIG. 5, the valves 94 are shown in the open position. The communication channels are kept as short as possible in order to minimize resin degradation therein.

In operation, the hot runner system 80 and shooting pots 81 are full of resin, valves 94 are opened and resin is supplied to the mold cavities to form further product in a product cycle via the nozzles. Valves 94 are then closed and piston 82 rapidly oscillated to alternately feed molten plastic in the closed communication channels in a manner similar to FIGS. 3-4. The product is removed and a further cycle commenced as above.

In order to insure that no air is trapped when starting the system, a special sequence may be used. Before introducing resin, piston 82 is moved to one end of shooting pot 81, for example, the end nearest actuator 84. The valve at the opposite end of the shooting pot is closed and the other other valve is opened. Resin is injected and as it flows into and past channel 92 the piston is moved to the other side of the cylinder. During this stroke, the air in front of the piston is vented through one nozzle and resin is drawn into the shooting pot through channel 92. Next the first valve is closed and the other opened. The piston is retracted and resin is drawn behind its other face through channel 93. Thus, the shooting pot is completely purged of air and filled with resin prior to commencement of molding operations.

During operation, the resin in the shooting pot can be flushed through to minimize degradation, by cycling the piston during injection, while the mold cavity is being filled. Only when both valves are closed, can melt oscillation in the mold cavity be accomplished.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. Method for forming molder plastic articles which comprises:

feeding molten plastic from a feeding means to at least one mold cavity via a hot runner channel in a hot runner system and nozzles, wherein at least two nozzles communicate with each mold cavity;

providing one shooting pot containing molten plastic communicating with two of said nozzles and with the mold cavity, wherein said feeding steps feeds molten plastic from a feeding means to the nozzles and to the shooting pot and to the mold cavity;

blocking the flow of molten plastic from the feeding means to the mold cavity and to the said one shooting pot to form a closed system between the shooting pot and mold cavity, wherein the flow of molten plastic from the feeding means and hot runner channel to the mold cavity and to the nozzles and shooting pot is blocked by valve means located in the hot runner system upstream of the shooting pot;

alternately feeding molten plastic from the said one shooting pot to the mold cavity by first feeding from the shooting pot to one of said nozzles followed by feeding from the shooting pot to a second of said nozzles, said feeding being while the flow of molten plastic to the mold cavity from the feeding means and hot runner system is blocked, whereby the molten plastic is oscillated in the mold cavity; and including the step of feeding molten plastic from the feeding means to a plurality of mold cavities, with two nozzles communicating with each mold cavity and separate shooting pots for each mold cavity, including the step of alternately feeding molten plastic from each shooting pot to its respective mold cavity.

2. Method according to claim 1 including the step of forming closed communication channels between said shooting pot and nozzles, wherein said alternate feeding step feeds molted plastic via said closed communication channels.

3. Method according to claim 1 including the step of providing entrances from said hot runner system to said closed communication channels and closing said entrances to form said closed communication channels.

4. Method according to claim 1 including the step of purging the air from the shooting pot.

5. Method according to claim 1 including the step of cycling the shooting pot while feeding molten plastic to the mold cavities to flush molten plastic from the shooting pot.

\* \* \* \* \*

UNITED STATES PATENT AND TRADEMARK OFFICE
CERTIFICATE OF CORRECTION

PATENT NO. : 5,260,012
DATED : November 9, 1993
INVENTOR(S) : Robin Arnott

It is certified that error appears in the above-indentified patent and that said Letters Patent is hereby corrected as shown below:

In Column 4, line 57, after "and" and before "4" the following should be inserted: --mold cavities. Figure 3 shows valves 75 open and Figure--;

In Column 6, claim 1, line 19, "molder" should read --molded--; and

In Column 6, claim 1, line 27, "steps" should read --step--.

Signed and Sealed this

Thirty-first Day of May, 1994

Attest:

BRUCE LEHMAN

*Attesting Officer*  *Commissioner of Patents and Trademarks*